(12) United States Patent
Miller

(10) Patent No.: US 6,341,078 B1
(45) Date of Patent: Jan. 22, 2002

(54) FULL BRIDGE POWER CONVERTER WITH ENHANCED RESONANT SWITCHING

(75) Inventor: Michael Lee Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,994

(22) Filed: Apr. 6, 2000

(51) Int. Cl.[7] .................................................. H02M 3/24
(52) U.S. Cl. ............................ 363/98; 363/17; 363/132
(58) Field of Search ............................. 363/17, 132, 98

(56) References Cited

U.S. PATENT DOCUMENTS

| | | | | |
|---|---|---|---|---|
| 4,736,149 A | * | 4/1988 | van den Eijnden | 363/25 |
| 5,438,498 A | * | 8/1995 | Ingemi | 363/132 |
| 5,917,722 A | * | 6/1999 | Singh | 363/132 |

OTHER PUBLICATIONS

Andreycak, Bill, "Phase Shifted, Zero Voltage Transition Design Considerations and the UC3875 PWM Controller", Unitrode Application Note U–136A, (May 1997), pp. 1–15.

Jain, Praveen et al., *Load and Line Independent Zero Voltage Switching Full Bridge DC/DC Converter Topology*, IEEE Document No. 0–7803–5069–3/98, (1998), pp. 22–29, No month.

* cited by examiner

*Primary Examiner*—Peter S. Wong
*Assistant Examiner*—Gary L. Laxton
(74) *Attorney, Agent, or Firm*—Wood Herron & Evans L.L.P.

(57) ABSTRACT

A circuit arrangement couples an energy storage circuit to at least one leg of a full bridge transistor topology in a full bridge power converter to facilitate resonant switching within that leg. Typically, the energy storage circuit includes an inductor coupled between the common node between the transistors in a leg and a reference voltage that is intermediate the relative voltages at which the inputs of the full bridge transistor topology are biased. The voltage drop across the inductor from the reference voltage to the common node permits energy stored in the energy storage circuit to charge the parasitic capacitance of a transistor that has been shut off during a transition, and thereby decrease the voltage drop across the complementary transistor to be turned on during the same transition. As a result, switching losses are reduced in the transistor being turned on, and overall efficiency of the converter is improved.

21 Claims, 4 Drawing Sheets

FULL BRIDGE POWER CONVERTER WITH ENHANCED RESONANT SWITCHING

FIELD OF THE INVENTION

The invention is generally related to power supplies and power converters, and in particular, to full bridge power converters incorporating resonant switching to minimize switching loss.

BACKGROUND OF THE INVENTION

Full bridge power converters are typically used in power supplies to convert a direct current (DC) power signal at one voltage to a DC power signal at another voltage. For example, in large multi-user computers, full bridge power converters are used to convert relatively high input power signals, e.g., about 400 VDC, to low power signals suitable for diving integrated circuitry, e.g., less than 5 VDC.

In one conventional design of a full bridge power converter, a full bridge transistor topology is formed by a set of four transistors, typically metal oxide silicon field effect transistors (MOSFET's). The bridge transistors are broken into two pairs, also referred to as "legs", with the transistors in each pair coupled in series, and the pairs coupled in parallel between the positive and negative input terminals (also referred to as high and low rails) of the converter. Outputs are formed by the common nodes between the transistors in each series pair. A capacitor is coupled in parallel with the full bridge, and the primary winding of a transformer is coupled between the outputs defined at the common nodes between the transistors in each series pair.

A full bridge power converter operates by supplying phase-shifted pulsed control signals to the transistors to provide a pulse width modulated (PWM) output signal at the secondary output of the transformer. Power is supplied to the transformer whenever the transistors at opposite corners of the bridge are simultaneously conducting, such that current flows from the positive input terminal, through the transistor in one leg of the bridge, through the transformer, and through the opposite transistor in the other leg back to the negative input terminal. Each transistor is typically supplied with a 50% duty cycle pulse, with the transistors in each series pair out of phase with one another such that at most one transistor, but not both, is on at any given time. The relative phasings between the series pair signals control the amount of time (or width) of the PWM output signal generated by the transformer. Using conventional rectification and filtering, an output signal with a desired DC voltage may be generated from the PWM signal.

An important concern with any power supply circuitry is efficiency, i.e., the percentage of input energy that is output as useful energy from the circuitry. Efficient circuitry consumes less power and generates less heat, which in turn enhances reliability. Another concern is electromagnetic interference (EMI), which can disturb the operation of adjoining circuitry absent appropriate shielding.

In some full bridge power converter designs, a significant contributor to both inefficiency and EMI emissions are the switching losses associated with the bridge transistors. For a MOSFET, for example, switching loss is a function of the voltage drop between the source and drain terminals of the MOSFET when the switch occurs. Switching losses increase with frequency; however, higher frequency reduces the required size of the magnetics (e.g., the transformer windings) in the circuit. Thus, a tradeoff has conventionally existed between operational frequency and switching losses.

To address these concerns, some full bridge power converter designs incorporate "resonant switching" to decrease the switching losses in the bridge transistors. Resonant switching is enabled by storing energy in the bridge and delaying the switching of one transistor in a leg to an on state after the other transistor in the leg is switched off. Doing so enables the stored energy in the bridge to charge the parasitic capacitance in the transistor that has been switched off to pull the voltage at the common node toward that at the input terminal to which the other transistor is coupled, thereby decreasing or eliminating any voltage drop across the latter transistor. Reducing the voltaic drop across the latter transistor likewise reduces switching losses when the transistor is turned on.

In practice, the control signals applied to one leg of the bridge (referred to as the "left" leg) lead the control signals applied to the other leg of the bridge (referred to as the "right" leg) such that transitions that occur on the left leg initiate a reversal in the direction of current flowing through the primary winding. Put another way, the left leg transitions typically occur at the start of the clock cycle, while the right leg transitions are controlled via a ramp and feedback error signal to modulate the duty cycle.

It has been found that resonant switching is more difficult when dealing with transitions in the "left leg" transistors than those in the "right leg" transistors. Typically, right leg transitions are adequately charged by the energy storage capability of the primary winding of the transformer (specifically the magnetizing inductance and/or the leakage inductance inherent in the primary winding), such that the winding functions as a current source. At left leg transitions, however, the energy stored in the primary winding is transferred to the transistor capacitance, discharging the capacitance to zero volts. This is a "true" resonant condition compared to the right leg case where the primary winding energy remains fairly constant through the transition (i.e., a current source). If the inductive energy is equal to or greater than the capacitive energy, then ZVS (zero voltage switching) is assured.

In many instances, particularly under light load where energy storage in the winding is the lowest, the inductance in the primary winding is not sufficient to fully enable resonant switching in the left leg. As a consequence, some full bridge power converter designs incorporate a shim inductor in series with the transformer primary winding between the bridge transistor legs. However, the use of a shim presents a number of drawbacks. For example, the shim must be sized to carry all of the primary current and reflected load current, thus increasing the amount of magnetics in the circuit. The additional inductance also limits the slew rate of the primary current, which increases the time period required to swing the primary current between positive and negative maximums, and thereby decreases the available duty cycle at the secondary output.

Therefore, a significant need continues to exist in the art for a manner of decreasing switching losses and thereby increasing the efficiency of a full bridge power converter, in particular, to address switching losses associated with left leg transitions in the same.

SUMMARY OF THE INVENTION

The invention addresses these and other problems associated with the prior art by coupling an energy storage circuit to at least one leg of a full bridge transistor topology to facilitate resonant switching within that leg. Typically, the energy storage circuit includes an inductor coupled between the common node between the transistors in a leg and a reference voltage that is intermediate the relative voltages at which the inputs of the full bridge transistor topology are biased. The voltage drop across the inductor from the reference voltage to the common node permits energy stored in the energy storage circuit to charge the parasitic capacitance of a transistor that has been shut off during a transition, and thereby decrease the voltage drop across the complementary transistor to be turned on during the same transition. As a result, switching losses are reduced, or eliminated, in the transistor being turned on, and overall efficiency of the circuit arrangement is improved. Moreover, while an energy storage circuit may be used to enhance resonant switching in either leg of a full bridge transistor topology, when used in connection with the left leg of the topology (where transitions result in a reversal of the direction of current flow), the additional energy supplied by the energy storage circuit is often sufficient to provide the energy necessary to fully discharge the transistor capacitance, resulting in lossless switching that is independent of load current.

In some implementations, it may also be desirable to vary the energy storage of the energy storage circuit responsive to load (e.g., by placing a switch in series with an inductor), such that the amount of energy supplied by the energy storage circuit is inversely proportional to the amount of load experienced by the circuit. Doing so often improves the overall efficiency of a full bridge power converter across a wider range of loads.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
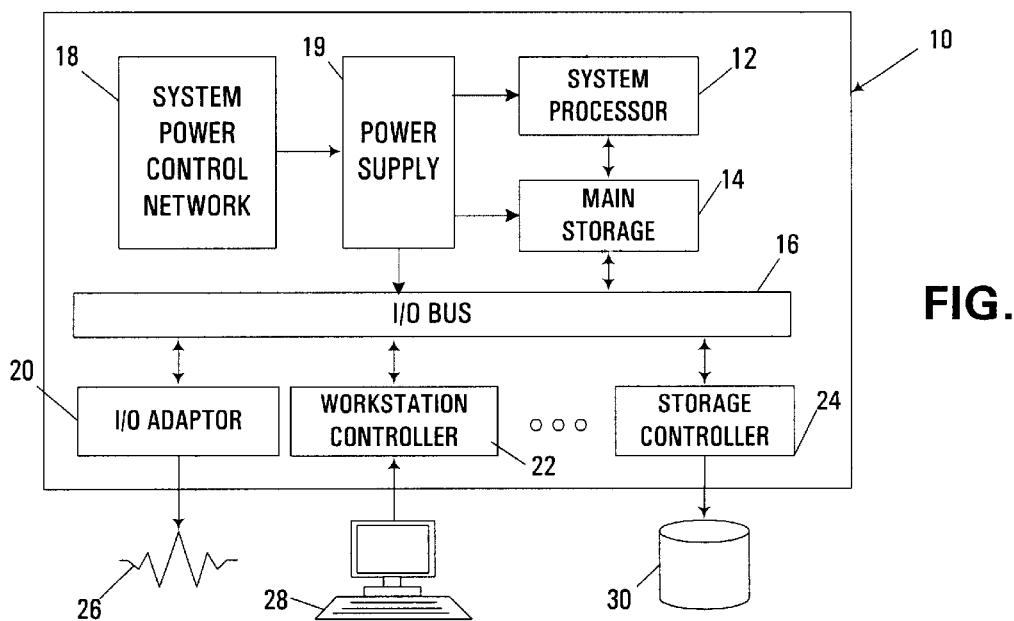
FIG. 1 is a block diagram of a computer incorporating a power supply consistent with the invention.

Turning to the Drawings, wherein like numbers denote like parts throughout the several views, FIG. 1 illustrates an apparatus 10 consistent with the invention. Apparatus 10 will hereinafter also be referred to as a "computer" or "computer system", although it should be appreciated the term "apparatus" may also include any other electronic device that incorporates a power supply and/or power conversion circuitry. In the illustrated embodiment, for example, apparatus 10 is implemented as an RS/6000 computer available from Intentional Business Machines Corporation.

Apparatus 10 includes one or more system processors 12 coupled to a main storage 14, and to a number of peripheral components via a system input/output (I/O) bus 16. Power to each of components 12–16 is provided by a system power control network 18 that is supplied with one or more sources of DC power by a power supply 19. A number of different peripheral components are supported, e.g., a network adapter 20, a workstation controller 22 and a storage controller 24, which respectively interface with a network 26, a workstation 28 and a storage device 30. Each of components 20–24 may be provided with power via I/O bus 16, or may have separate power supplies in some embodiments. Moreover, additional components may be ultimately powered by system power control network 18 and power supply 19 consistent with the invention.

System power control network 18 operates in a known manner to selectively supply power to the various components in computer 10, as well as to perform various monitoring functions to ensure uninterrupted power. Power supply 19 generally receives an AC power signal and outputs one or more DC power signals as appropriate for serving the power requirements of computer 10. It will be appreciated, however, that the implementation of a full-bridge power converter in the power supply of computer 10 is but one of an innumerable number of possible applications of such a power converter. As such, the invention is not limited to the particular implementation discussed herein.

Figure 2:
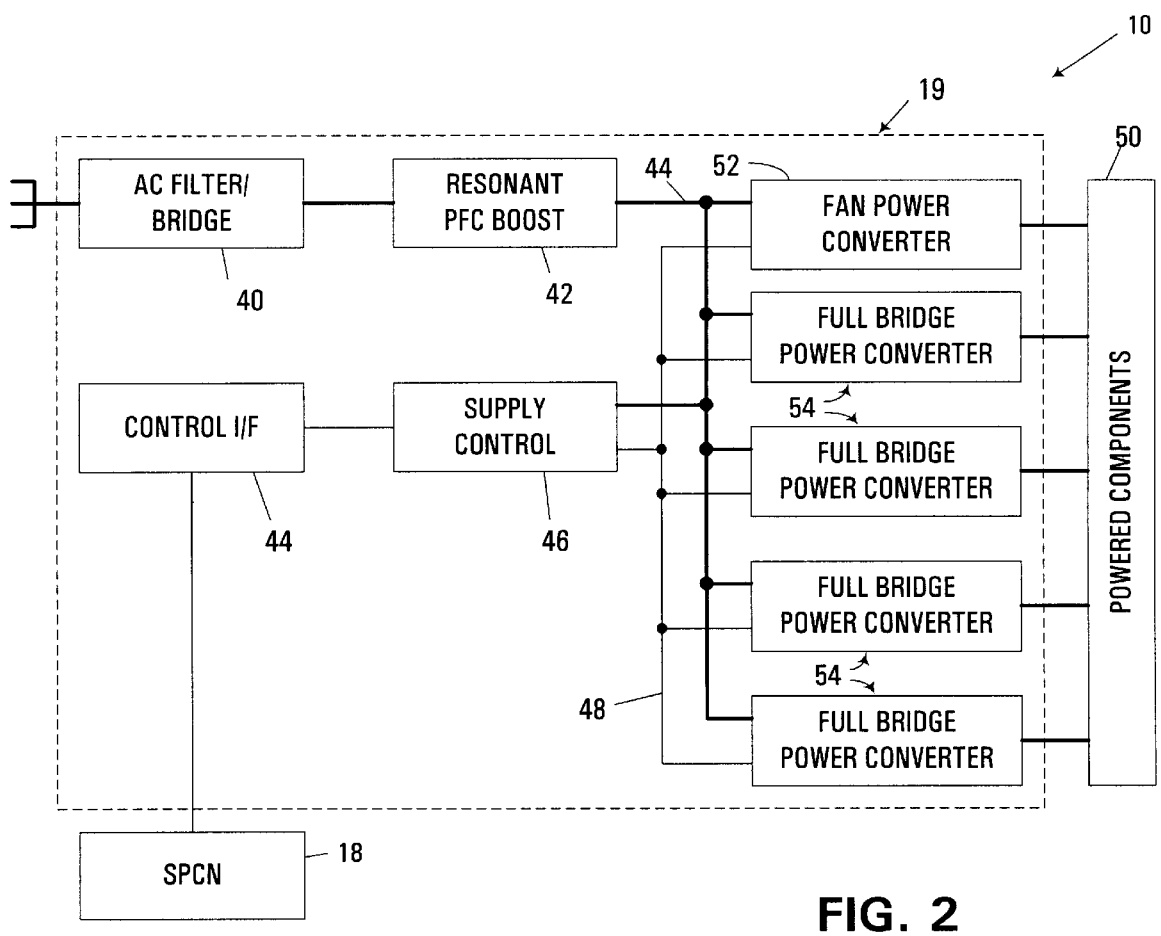
FIG. 2 is a block diagram of the power supply of FIG. 1, incorporating a full bridge power converter consistent with the invention.

FIG. 2 illustrates power supply 19 in greater detail, specifically configured to supply power to an RS/6000 computer. AC line power is received by an AC filter/bridge 40, and is fed into a resonant power factor corrected (PFC) boost circuit 42, the Output of which is a 390 VDC bus 44. Control signals for the power supply are supplied by SPCN 18 via a control interface block 44, which provides the control signals to a supply control circuit 46. Internal control signals are then output on a control signal bus 48. Coupled to both 44 and bus 48 are a plurality of power converters 52, 54, which provide appropriate DC power signals to the various power components in computer 10 (represented by block 50). A variable number of power converters 52, 54 may be utilized depending upon the power requirements of computer 10. For example, power converter 52 is illustrated as a fan power converter utilized to output a 24 VDC signal to the cooling fans for the computer. Four additional power converters 54 are illustrated as full bridge power converters utilized to provide low-voltage DC power signals to the various electronic components in computer 10. In the illustrated implementation, it is within each full bridge power converter 54 that resonant switching consistent with the invention is implemented, with the voltage outputs of each full bridge power converter 54 selected to provide a desirable output voltage for the specific components being powered by Such converters. It will be appreciated that the specific output levels and number of power converters utilized in power supply 19 will vary for different applications.

Figure 3:
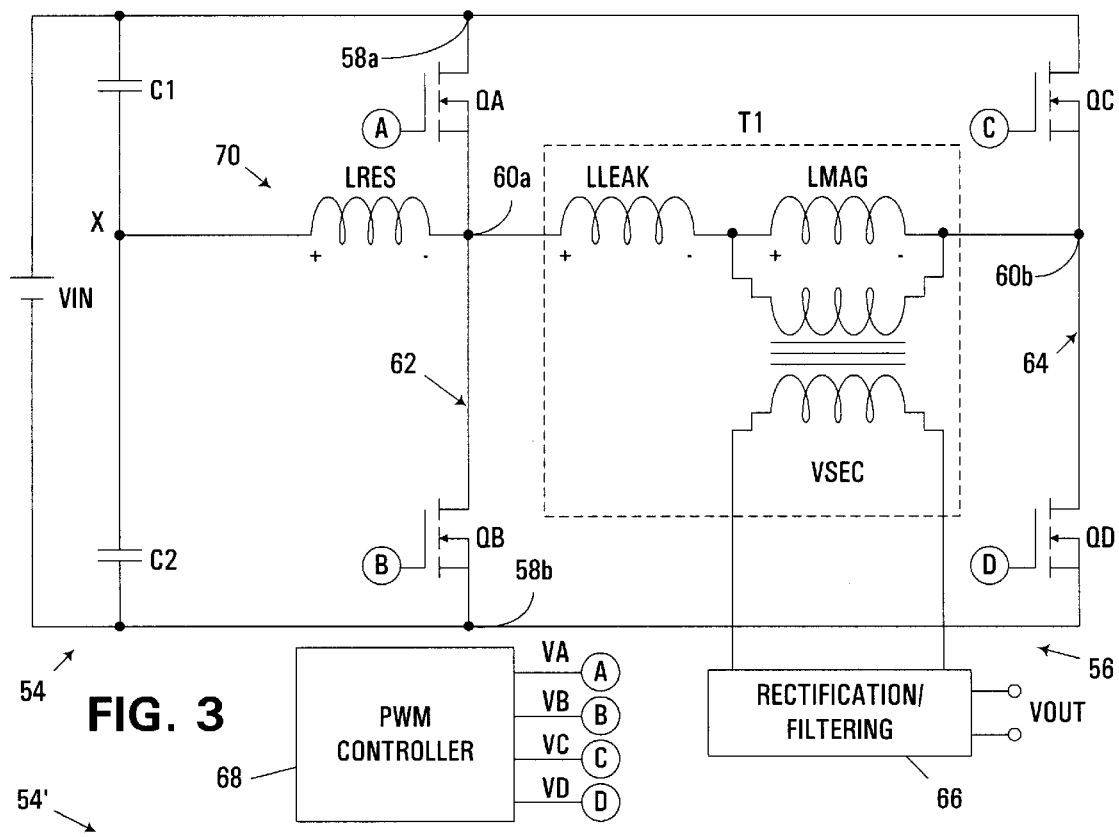
FIG. 3 is a circuit diagram of one implementation of the full bridge power converter of FIG. 2.

FIG. 3 next illustrates one suitable implementation of full bridge power converter 54 consistent with the invention. Converter 54 includes a full bridge transistor topology 56 including a pair of inputs 58a, 58b and a pair of outputs 60a, 60b. The inputs 58a, 58b are coupled across the voltage input to the converter, represented at VIN. A transformer T1 is coupled between the outputs 60a, 60b of the full bridge topology 56, with in the inductance thereof represented by the combination of the magnetizing inductance LMAG and the leakage inductance LLEAK in the primary winding of transformer T1. The secondary winding of transformer T1 is coupled to a rectification/filtering block 66, functioning as the secondary output circuit that outputs the appropriate DC voltage signal from the converter at the output terminals labeled VOUT.

Topology 56 includes a set of four metal oxide silicon field effect transistors (MOSFET's) QA, QB, QC, QD coupled at the four corners of the bridge. Namely, MOSFET QA is coupled between input 58a and output 60a, MOSFET QB is coupled between input 58b and output 60a, MOSFET QC is coupled between input 58a and output 60b and MOSFET QD is coupled between input 58b and output 60b. MOSFET's QA and QB, and QC and QD, respectively, form series transistor pairs defined in separate legs 62, 64 of the topology. A pulse width modulated (PWM) controller 68 is coupled to the gate of each of MOSFET's QA–QD to supply appropriate control signals (represented at VA–VD) to drive the gate inputs of the MOSFET's with phase shifted resonant pulse width modulated control signals and thereby induce an output signal across outputs 60a, 60b.

It will be appreciated that the operation and configuration of topology 56, secondary output block 66 and controller 68 are well known in the art. For example, controller 68 may be implemented using a UC3875 PWM controller available from Texas Instruments. Any number of alternate control algorithms and circuits, as well as secondary output rectification and/or filtering circuits may also be used.

To implement enhanced resonant switching consistent with the invention, an energy storage circuit 70 is coupled to output 60a of the full bridge transistor topology 56. The other end of circuit 70 is connected to a reference voltage input, labeled X, that is disposed at a voltage that is intermediate the voltages at which each of inputs 58a, 58b are biased. In the illustrated implementation, a voltage of about one-half VIN is used for the reference voltage input X. This voltage reference is provided by splitting the single capacitor that is conventionally coupled in parallel with a full bridge transistor topology into a series coupling of two capacitors C1 and C2. The reference voltage is selected to be biased to an intermediate voltage such that a net voltage drop is provided across the energy storage device (e.g., inductor) in the energy storage circuit 70 whenever one of the MOSFET's QA and QB is conducting.

In addition, in the illustrated implementation, the energy storage capacity for circuit 70 is provided by a resonant inductor LRES coupled between output 60a and reference voltage input X. The value of the resonant inductor LRES is selected to be 140 microhenries, although this value will vary for different implementations.

Figure 4A:
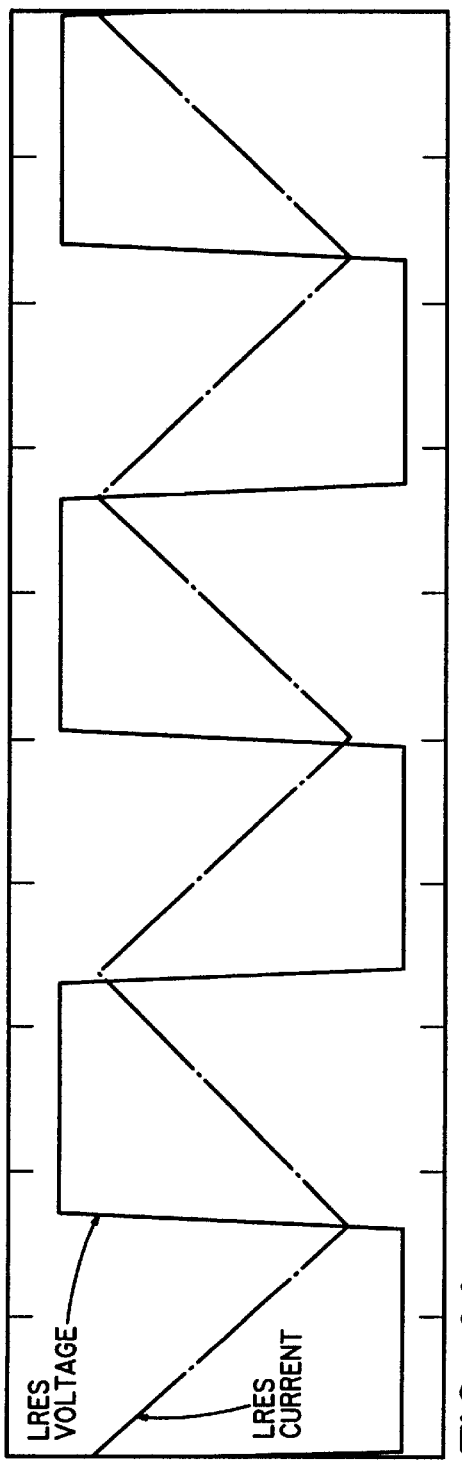
FIGS. 4A and 4B are timing diagrams respectively illustrating voltage drop and current through the resonant inductor, and primary voltage drop, secondary voltage drop, and current through the transformer, for the full bridge power converter of FIG. 3.
Figure 4B:
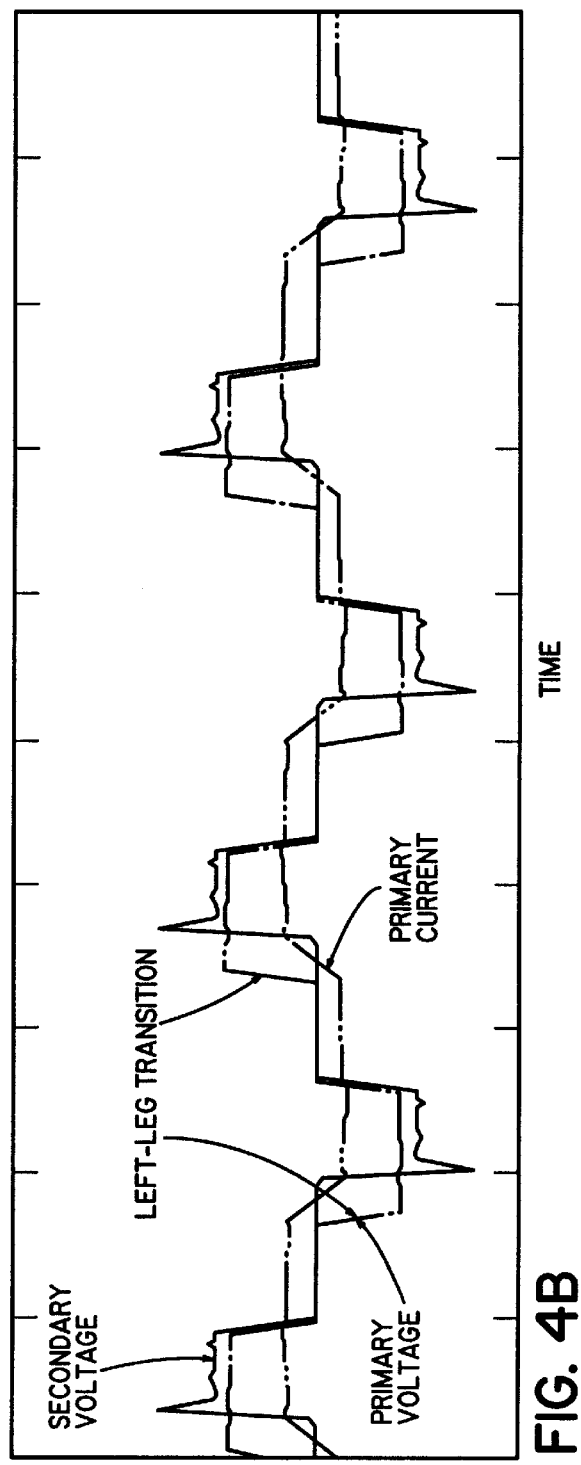

FIGS. 4A and 4B illustrate the effects of the resonant inductor on the operation of converter 54. Specifically, FIG. 4A illustrates the voltage drop and current through the resonant inductor during operation of the converter. The inductor has a fifty percent duty cycle square wave voltage across it with a triangular current wave form. The voltage across the inductor is equal to +/−VIN/2, and the peak current is determined by the value of inductance. The energy in the inductor is proportional to the input voltage squared and inversely proportional to the inductance value.

FIG. 4B illustrates the voltage across the primary winding of transformer T1, the voltage across the secondary winding of transformer T1, and the current for the primary winding of T1, using the same units of time as illustrated in FIG. 4A. It can be seen from FIGS. 4A and 4B that the resonant transitions for the MOSFET's occur at the peaks of the resonant inductor current, when the energy stored is greatest. At the switching transition of QA and QB, this energy is utilized to resonate with the parasitic capacitance of the MOSFET being switched off to bring the drain-source voltage of the complimentary MOSFET to zero prior to turning on the complimentary MOSFET, thereby substantially reducing or eliminating switching losses associated with the turning on of the complimentary MOSFET. Since the energy in the resonant inductor is proportional to the input voltage squared, more energy is available for high line transitions. In addition, the energy is independent of load current, so resonant switching is possible down to light loads.

It can also be seen that, in contrast to the use of additional inductance in series with the primary winding of the transformer, the resonant inductor is not required to carry all of the primary current and reflected low current, thereby minimizing the magnetics required in the circuit. In addition, the limit on the slew rate of the primary current typically induced from the addition of inductance in series with a transformer is avoided, thereby improving the duty cycle of the circuit.

Circulating current from the resonant inductor flows in the left leg MOSFET's, where it is desired for resonant switching. However, the resonant circulating current does not flow in the transformer primary winding or the right leg MOSFET's, so the additional conduction loss due to the circulating current is limited to the two left leg MOSFET's, which is substantially lower than the switching losses that would otherwise occur. Moreover, since the resonant inductor does not carry the reflected load current, copper loss is typically lower.

Figure 5:
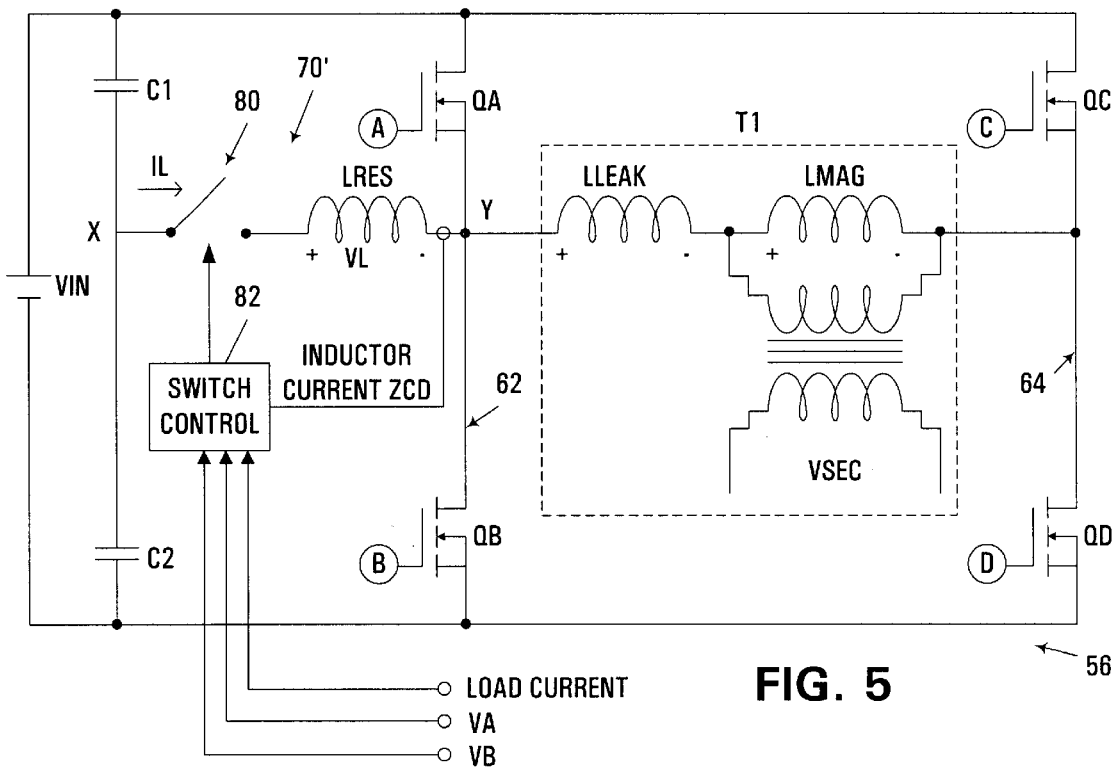
FIG. 5 is a circuit diagram of an alternative implementation of the full bridge power converter of FIG. 2, incorporating load-responsive switching.

As discussed above, the energy supplied by the resonant inductor typically increases with the input voltage, but is independent of load current. Since the effects of insufficient energy to achieve resonant switching are more pronounced at light loads, it may be desirable in some instances to provide a variable energy storage capacity in circuit 70 that is inversely proportional to the amount of load to which converter 54 is subjected. For example, as illustrated in FIG. 5, an alternate full bridge power converter design 54' may incorporate an alternate energy storage circuit 70' having the resonant inductor LRES in series with a switch 80 controlled via a switch control or load sensing circuit 82. Switch 80 may be controlled in such a manner that the stored energy in the resonant inductor is an inverse function of the load current. Put another way, at lighter loads, the switch control circuit 82 may be configured to provide maximum peak current energy in the resonant inductor, with the amount of current and energy dropping to a lower value, (even completely shut off) at heavier load currents where the additional energy is not required. In this way, the efficiency of the converter may be improved over the entire load range with no increase in conduction loss of the left leg MOSFET's at maximum load. Switch 80 may be implemented using a MOSFET, triac, saturable reactor, or other similar type of switch. In this configuration, the switch effectively blocks the voltage across the resonant inductor for a portion of the switching cycle to limit the peak current available for the following transition.

Various manners of controlling switch 80 may be utilized, e.g., simply turning the series switch 80 on or off based upon whether the converter load current is above or below a particular threshold. In other implementations, however, it may be desirable to provide switch control circuit 82 with additional inputs, e.g., the converter load current, and the left leg input voltages VA, VB, as well as the input of an inductor current zero crossing detector, as shown in FIG. 5.

Implementation of a suitable control algorithm for controlling switch 80 responsive to load would be within the ability of one of ordinary skill in the art having the benefit of the instant disclosure. For example, in the converter design of FIG. 5, the resonant inductor voltage drop VL is equal to ± VIN/2 when the series switch is on. The slope of the current through the resonant inductor (IL) is related to the voltage drop VL as follows:

$$VL = LRES \frac{di}{\Delta T}$$

where di is the current slope and ΔT is the time interal when the voltage VL is applied across the resonant inductor.

For the peak current condition (where di=IPEAK), the current through the resonant inductor is therefore:

$$IPEAK = \frac{VIN \times \Delta T}{2 \times LRES}$$

As such, the maximum energy available for resonant transition from the resonant inductor is (assuming little if any energy comes from the transformer winding, this is a close approximation for the minimum load case):

$$E = \frac{1}{2} LRES(IPEAK)^2 = \frac{1}{2} LRES \left(\frac{VIN \times \Delta T}{2 \times LRES}\right)^2 = \frac{VIN^2 \times \Delta T^2}{8 \times LRES}$$

Lossless resonant switching of MOSFET's QA and QB occurs when the energy available from the resonant inductor is greater than or equal to the energy required to charge the parasitic capacitance of the MOSFET's, that is:

$$\frac{VIN^2 \times \Delta T^2}{8 \times LRES} \geq \frac{1}{2} CFET \times VIN^2$$

where CFET is the parasitic MOSFET and circuit capacitance in the left leg of the fill bridge transistor topology. As such:

$$LRES \leq \frac{\Delta T^2}{4 \times CFET}$$

To implement a switch control algorithm to provide maximum efficiency across all load ranges, $\Delta T_{MAX}$ and LRES should be chosen to achieve resonant transitions at some minimum load current. Then, ΔT may be controlled via the switch control logic Such that $\Delta T \leq \Delta T_{MAX}$ and $IPEAK \leq I_{MAX}$ to achieve resonant transitions tinder all load conditions with a minimum of circulating current in LRES for the highest efficiency.

Figure 6:
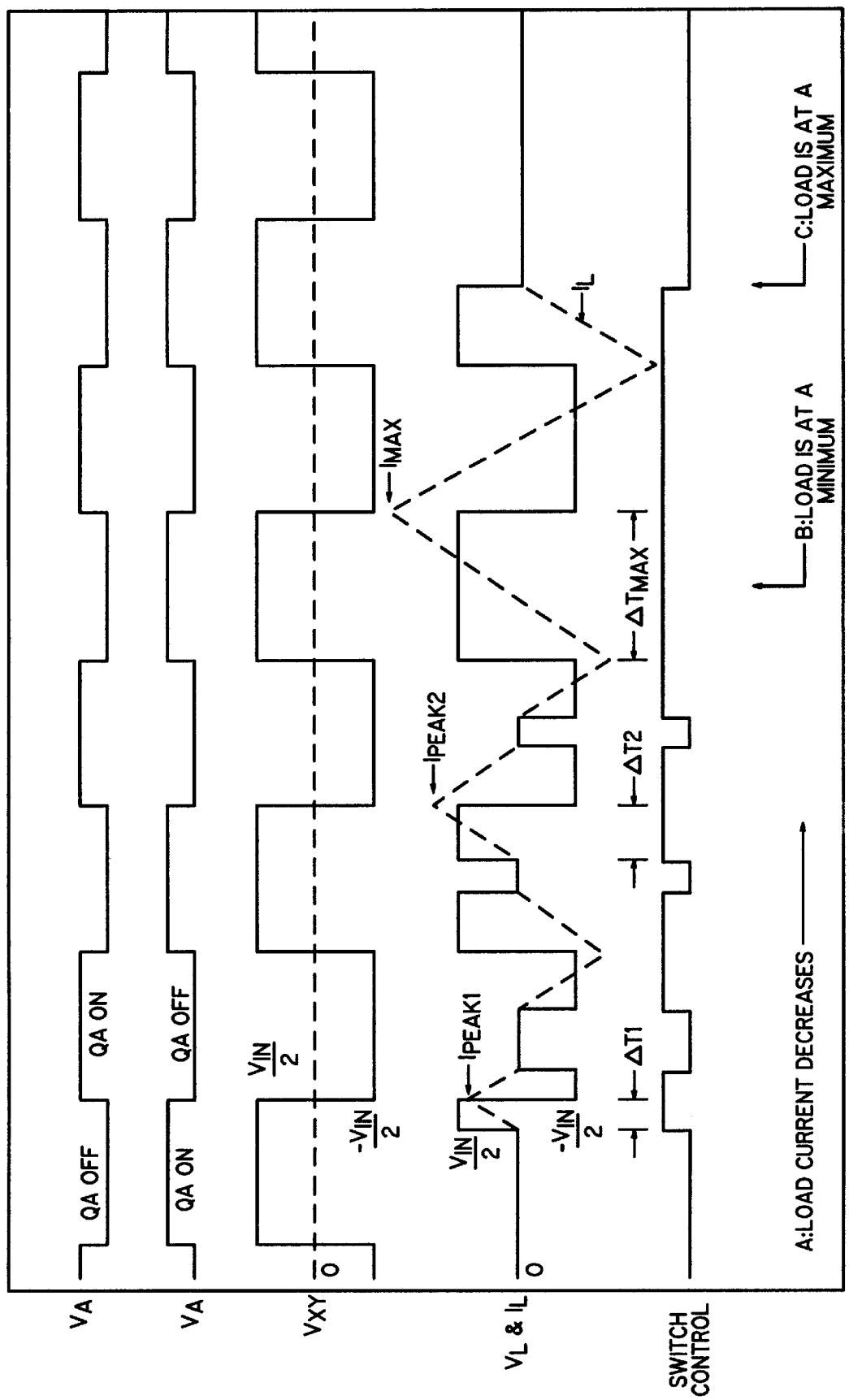
FIG. 6 is a timing diagram illustrating the operation of the switch control circuit in the alternate full bridge power converter implementation of FIG. 5.

FIG. 6, for example, illustrates how the output of switch control block 82 may be varied responsive to the aforementioned inputs, illustrating three phases, a first (denoted at "A") where the load current decreases to a second phase (denoted at "B"), where the load is at a minimum, and finally in a third phase (denoted at "C") where the load is at a maximum.

As a result, it may be seen that switching losses may be significantly reduced over conventional designs. Doing so may permit a higher frequency to be used to drive the bridge transistors, thereby reducing the magnetics required in the converter. Moreover, EMI is reduced, and the overall efficiency of the converter is improved. Additionally, lossy snubber circuits are typically not required to inhibit the ringing (EMI) and overvoltages that occur across transistors with hard switching.

Various modifications may be made to the illustrated embodiments without departing from the spirit and scope of the invention. For example, alternate manners of providing variable energy from an energy storage circuit may be utilized in the alternative, e.g., by providing a variable inductance or a variable reference voltage. Furthermore, an energy storage circuit consistent with the invention may be utilized in the right leg of a full bridge transistor topology in addition to or in lieu of a left leg of a topology. Other transistors may also be utilized in the topology, and further, other sources of a reference voltage (which may be fixed or variable) may also be used in lieu of a series arrangement of capacitors. In addition, since the conventional input capacitor is replaced by two capacitors in series in the illustrated implementations, the volt-seconds across the resonant inductor may be larger, so a physically larger core may be used, in some instances.

Other modifications will be apparent to one of ordinary skill in the art. Therefore, the invention lies in the claims hereinafter appended.

What is claimed is:

1. A circuit arrangement, comprising:
   (a) first, second, third and fourth transistors coupled in a full bridge topology, the full bridge topology including first and second inputs and first and second outputs, the first transistor coupled between the first input and the first output, the second transistor coupled between the second input and the first output, the third transistor coupled between the first input and the second output, and the fourth transistor coupled between the second input and the second output;
   (b) a reference voltage input configured to receive a reference voltage that is intermediate first and second voltages at which the first and second inputs are biased;
   (c) an inductor coupled between reference voltage input and the first output;
   (d) a switch coupled in series with the inductor between the first output and the reference voltage input; and
   (e) a load sensing circuit coupled to the switch and configured to control the current through the inductor as an inverse function of load.

2. The circuit arrangement of claim 1, wherein each of the first, second, third and fourth transistors comprises a MOSFET.

3. The circuit arrangement of claim 1, further comprising first and second capacitors, the first capacitor coupled between the first input and the reference voltage input, and the second capacitor coupled between the second input and the reference voltage input.

4. The circuit arrangement of claim 3, wherein the first and second capacitors are configured to provide a reference voltage at the reference voltage input of about one half the voltage drop between the first and second inputs.

5. The circuit arrangement of claim 1, further comprising a transformer including primary and secondary windings, the primary winding coupled between the first and second outputs.

6. The circuit arrangement of claim 5, further comprising a control circuit configured to drive control inputs of the first, second, third and fourth transistors with phase shifted resonant pulse width modulated control signals.

7. The circuit arrangement of claim 5, further comprising a secondary output circuit coupled to the secondary winding of the transformer.

8. The circuit arrangement of claim 1, wherein the switch is selected from the group consisting of a MOSFET, a triac, and a saturable reactor.

9. The circuit arrangement of claim 1, wherein the first and second transistors comprise a left leg of the full bridge topology, and the third and fourth transistors comprise a right leg of the full bridge topology.

10. A power supply comprising the circuit arrangement of claim 1.

11. A computer comprising the circuit arrangement of claim 1.

12. A full bridge power converter circuit arrangement, comprising:

(a) first and second inputs;

(b) first, second, third and fourth MOSFET's coupled in a full bridge topology, the full bridge topology including first and second legs coupled in parallel with one another between the first and second input terminals, the first leg including the first and second MOSFET's coupled in series between the first and second input terminals, and the second leg including the third and fourth MOSFET's coupled in series between the first and second input terminals, the first and second MOSFET's coupled to one another at a first bridge output and the third and fourth MOSFET's coupled to one another at a second bridge output;

(c) a transformer including a primary winding and a secondary winding, the primary winding coupled between the first and second bridge outputs;

(d) first and second capacitors coupled in series between the first and second input terminals, the first and second capacitors coupled to one another at a common node;

(e) a control circuit configured to drive gate inputs of the first, second, third and fourth MOSFET's with phase shifted resonant pulse width modulated control signals;

(f) an inductor coupled between the first bridge output and the common node defined between the first and second capacitors to facilitate resonant transitions in the first leg of the full bridge topology;

(g) a switch coupled in series with the inductor between the first bridge output and the common node defined between the first and second capacitors; and (h) a load sensing circuit coupled to the switch and configured to control the current through the inductor as an inverse function of load.

13. The full bridge power converter circuit arrangement of claim 12, further comprising a secondary output circuit arrangement coupled to the secondary winding of the transformer.

14. The full bridge power converter circuit arrangement of claim 12, wherein the switch is selected from the group consisting of a MOSFET, a triac, and a saturable reactor.

15. The full bridge power converter circuit arrangement of claim 12, wherein the first leg is a left leg, and the second leg is a right leg.

16. A circuit arrangement, comprising:

(a) a transformer including a primary winding;

(b) a full bridge topology circuit arrangement having first and second inputs configured to be coupled to an input voltage source and first and second outputs between which the primary winding of the transformer is coupled, the full bridge topology circuit arrangement including first and second legs, the first leg including a first transistor coupled between the first input and the first output and a second transistor coupled between the second input and the first output, and the second leg including a third transistor coupled between the first input and the second output and a fourth transistor coupled between the second input and the second output;

(c) a control circuit configured to drive the first, second, third and fourth transistors by phase shifted resonant pulse width modulated control signals such that at most one transistor in each leg is driven at any given time, the control circuit configured to provide alternating first leg and second leg transitions during which respective states of the transistors within each leg are reversed; and (d) an energy storage circuit coupled between the first output and a reference voltage input and configured to supply energy to the first leg during first leg transitions to facilitate resonant switching of the first leg transistors, wherein the energy storage circuit is load responsive such that the energy supplied to the first leg during first leg transitions is inversely proportional to load.

17. The circuit arrangement of claim 16, wherein the energy storage circuit includes an inductor.

18. The circuit arrangement of claim 16, further comprising first and second capacitors, the first capacitor coupled between the first input and the reference voltage input, and the second capacitor coupled between the second input and the reference voltage input.

19. The circuit arrangement of claim 16, wherein the energy storage circuit includes a switch coupled in series with an inductor between the first output and the reference voltage input, wherein the energy storage circuit is configured to control the switch to regulate the energy supplied to the first leg during first leg transitions.

20. The circuit arrangement of claim 16, wherein the energy storage circuit includes an inductor coupled between the first output and the reference voltage input, and wherein the energy storage circuit is configured to control at least one of the voltage at the reference voltage input and the inductance of the inductor to regulate the energy supplied to the first leg during first leg transitions.

21. The circuit arrangement of claim 16, wherein the first leg is a left leg, and the second leg is a right leg.

* * * * *